United States Patent
Brazeau

(10) Patent No.: US 10,528,061 B2
(45) Date of Patent: Jan. 7, 2020

(54) ROBOTIC AD HOC NETWORK

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 15/333,636

(22) Filed: Oct. 25, 2016

(65) Prior Publication Data
US 2018/0113475 A1   Apr. 26, 2018

(51) Int. Cl.
*G05D 1/02* (2006.01)
*G05D 1/00* (2006.01)
*H04W 84/18* (2009.01)

(52) U.S. Cl.
CPC ......... *G05D 1/0291* (2013.01); *G05D 1/0027* (2013.01); *G05D 1/0276* (2013.01); *G05D 1/0289* (2013.01); *G05D 1/0297* (2013.01); *G05D 2201/0216* (2013.01); *H04W 84/18* (2013.01)

(58) Field of Classification Search
CPC .. G05D 1/0291; G05D 1/0027; G05D 1/0276; G05D 1/0289; H04W 84/18
See application file for complete search history.

(56) References Cited

U.S. PATENT DOCUMENTS

| | | | |
|---|---|---|---|
| 8,280,547 B2 | 10/2012 | D'Andrea et al. | |
| 8,483,869 B2 * | 7/2013 | Wurman | B65G 1/1378 414/807 |
| 9,087,314 B2 | 7/2015 | Hoffman et al. | |
| 9,120,622 B1 * | 9/2015 | Elazary | B65G 1/1373 |
| 9,260,244 B1 | 2/2016 | Cohn | |
| 9,510,316 B2 * | 11/2016 | Skaaksrud | H04W 12/06 |
| 2007/0008918 A1 * | 1/2007 | Stanforth | H04W 40/38 370/328 |

(Continued)

OTHER PUBLICATIONS

PCT/US2017/058196, "International Search Report and Written Opinion", dated Dec. 20, 2017, 16 pages.

(Continued)

*Primary Examiner* — Kira Nguyen
(74) *Attorney, Agent, or Firm* — Kilpatrick Townsend & Stockton LLP

(57) ABSTRACT

Described herein is system in which separate networks are operated on behalf of system components associated within an inventory system. Mobile drive units may receive initial instructions from a central authority and may identify a number of system components relevant to the provided instructions. The mobile drive unit may be configured to traverse to locations associated with the identified system components. As the mobile drive unit traverses the inventory floor, it may connect to the separate networks that it comes into contact with. Upon connecting to a network associated with a system component relevant to its set of instructions, the mobile drive unit may provide instructions to the system component to cause it to execute an action. In some embodiments, the mobile drive unit may connect to a system component in order to perform a route guidance algorithm and/or collision avoidance algorithm.

20 Claims, 10 Drawing Sheets

(56) References Cited

U.S. PATENT DOCUMENTS

| | | |
|---|---|---|
| 2012/0239224 A1 | 9/2012 | Mccabe et al. |
| 2013/0304253 A1 | 11/2013 | Wurman et al. |
| 2015/0032252 A1 | 1/2015 | Galluzzo et al. |
| 2016/0101940 A1* | 4/2016 | Grinnell ............... G05D 1/0297 700/216 |
| 2016/0176638 A1* | 6/2016 | Toebes ................. G06Q 10/087 700/216 |
| 2016/0266578 A1 | 9/2016 | Douglas et al. |

OTHER PUBLICATIONS

PCT/US2017/058196 , "International Preliminary Report on Patentability", dated May 9, 2019, 13 pages.

\* cited by examiner

ROBOTIC AD HOC NETWORK

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Entities that utilize inventory systems may elect to automate those systems (e.g., via the use of robotics). This often results in the inventory system needing to track and manage a number of components (robots, sensors, workstations, etc.) connected to the inventory system (whether connected via wireless or direct physical connection). Accordingly, even a small increase in the number of components of the inventory management system may result in a large increase in the amount of bandwidth and/or processing power needed by the inventory management system.

BRIEF DESCRIPTION OF THE DRAWINGS

Various embodiments in accordance with the present disclosure will be described with reference to the drawings, in which.

DETAILED DESCRIPTION

Figure 1:
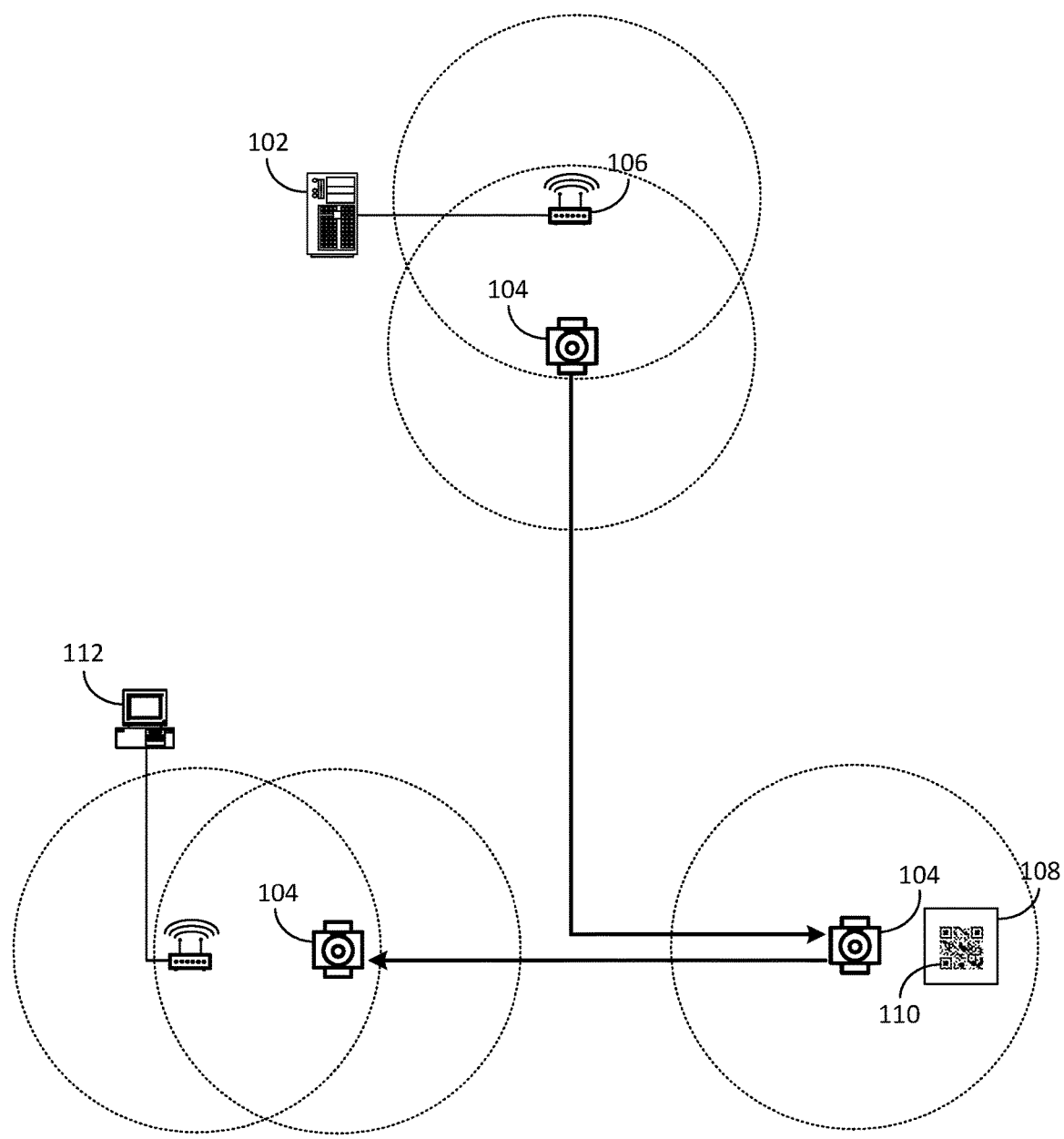
FIG. 1 illustrates an example inventory system in which task assignments may be provided to mobile drive units via ad hoc networks in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system that includes mobile drive units and/or other robotic components managed via a series of local networks. Specifically, features herein are directed to a series of separate wireless local networks, each operated by various system components. Upon entering within transmission range of a wireless local network, a mobile drive unit may connect to the local network, identify the system component associated with the local network, determine if the mobile drive unit has been provided with any instructions directed to the system component, and execute one or more instructions related to the identified system component. A system component may be any resource or device that performs a function on behalf of the inventory system. By way of non-limiting example, a system component may comprise a robotic device, an input sensor, an inventory holder, a workstation, or any other suitable system resource.

In accordance with an embodiment, a mobile drive unit may approach a central authority to receive instructions. The central authority may identify a task that the mobile drive unit is capable of performing and may generate a task assignment based on the identified task. The task assignment may comprise a set of instructions that cause the mobile drive unit to perform various actions with respect to various system components (e.g., robotic devices, input sensors, inventory holders, etc.). In some embodiments, one or more wireless local networks may be operated with respect to these various system components. The mobile drive unit may be configured (via the task assignment) to visit each of these system components in turn and execute the actions indicated in the task assignment. As the mobile drive unit enters within a proximity of the system component, it may connect to the wireless local network associated with that system component. Upon establishing a connection to the wireless local network, the mobile drive unit may transmit instructions to cause the system component to complete the action indicated in the task assignment with respect to that system component.

By way of illustration, a mobile drive unit may receive instructions from a central authority to retrieve a specified inventory holder from the inventory floor and deliver that inventory holder to a specified workstation. The mobile drive unit may also be provided with an indication of a type and quantity of items to be retrieved from that inventory holder. In this illustrative example, the mobile drive unit may traverse to the specified inventory holder, collect the inventory holder, and traverse to the specified workstation. Upon nearing the specified workstation, the mobile drive unit may detect a local area network operated with respect to the workstation. The mobile drive unit may connect to this local area network and transmit instructions to the workstation that indicate the items to be removed from the inventory holder. Continuing with this example, an operator may remove the indicated items from the inventory holder and signal to the mobile drive unit (e.g., via a graphical user interface (GUI) executed by a computing device at the workstation) that the items have been removed. Upon receiving this signal, the mobile drive unit may return the inventory holder and may subsequently return to the central authority for further instructions.

Although the disclosure relates to an inventory management system, it would be recognized by one skilled in the art that embodiments of the disclosure may be implemented in a number of alternative environments. For example, described techniques may be applied to autonomous vehicles within a traffic system. It should be noted that the description of an inventory management system in the context of the described disclosure is presented as an exemplary embodiment only, and is not intended to be limiting.

FIG. 1 illustrates an example inventory system in which task assignments may be provided to mobile drive units via ad hoc networks in accordance with some embodiments. In FIG. 1, a computing device including a management module 102 may be in communication with a mobile drive unit 104. The computing device including the management module 102 may be configured to communicate one or more sets of computer executable instructions (e.g., task assignments) to the mobile drive unit 104 via a communication mechanism 106. Examples of a communication mechanism may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication mechanism 106 may include an infrared communication device. In some embodiments, the communication mechanism 106 may include both long range and short range communication means. For example, the communication mechanism may include an antenna configured to connect to a cellular network in order to enable communication with various other components of the depicted inventory system. In addition, the inventory system may include a number of inventory holders 108, each of which may be identified via an inventory holder identifier 110. The inventory system may additionally include a workstation computing device 112.

In some embodiments, the computing device executing the management module 102 may discover the presence of a mobile drive unit 104. For example, the mobile drive unit 104 may connect to a private network when it is within range of the short range communication mechanism 106. Upon detecting that the mobile drive unit 104 has connected to the private network, the computing device including the management module 102 may be configured to receive a report on the status of the mobile drive unit 104, identify a current status of the mobile drive unit, identify an appropriate task assignment for the mobile drive unit, generate instructions to result in the completion of the task assignment by the mobile drive unit 104, and transmit the task assignment to the mobile drive unit 104. In some embodiments, the management module 102 may determine what task assignment is appropriate for a mobile drive unit based on the type and/or capabilities associated with the mobile drive unit. For example, the management module 102 may receive an identifier associated with the mobile drive unit and may determine, based on that identifier, a type and/or identity of the mobile drive unit. The management module 102 may then query a database of mobile drive units to identify the detected mobile drive unit and its capabilities.

In some embodiments, a task assignment may include an identification of an inventory holder 108, an identification of one or more items in the inventory holder 108 to be retrieved, and an identification of a workstation. The task assignment may include instructions that cause a mobile drive unit 104 to retrieve the identified inventory holder, bring the retrieved inventory holder to the identified workstation, and provide the indication of the one or more items to the workstation to be conveyed to an administrator. Upon receiving a task assignment from the computing device executing the management module 102, the mobile drive unit 104 may generate a route to an indicated inventory holder 108 and subsequently to an indicated workstation.

Upon arriving at the inventory holder 108, the mobile drive unit may verify that the inventory holder 108 is the indicated inventory holder based on an inventory holder identifier located on or near that inventory holder 108. The mobile drive unit 104 may then retrieve the inventory holder 108 or one or more items located within the inventory holder 108 in accordance with the task assignment. The mobile drive unit 104 may then move to the indicated workstation with the retrieved inventory holder 108.

Upon arriving at the indicated workstation, the mobile drive unit 104 may connect to a second network operated by a workstation computing device 112. Upon connecting to the second network, the mobile drive unit 104 may communicate one or more instructions to the a workstation computing device 112 via the second private network. For example, the mobile drive unit 104 may communicate an indication of the one or more items to be removed from the inventory holder 108 to the workstation computing device 112. In some embodiments, an administrator or other operator may remove the items from the inventory holder and provide a status update to the mobile drive unit 104. For example, if the operator is unable to locate an indicated item, the operator may update a status with the mobile drive unit 104, via the second network, to indicate that the item was not found. The mobile drive unit 104 may then generate a status alert to be provided to the computing device executing the management module 102.

In accordance with at least some embodiments, the mobile drive units may each include a communication mechanism. In these embodiments, the mobile drive unit may operate a network. Various system components may each have a wireless transmitter/receiver and may connect to a network operated by the mobile drive unit 104 as the mobile drive unit comes within transmission range of the system components. In some embodiments, each system component may announce its identifier over the network operated by the mobile drive unit as it connects to the network, which the mobile drive unit 104 may use to determine if the system component is relevant. In some embodiments, the mobile drive unit 104 may only allow certain system components to connect to its network.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
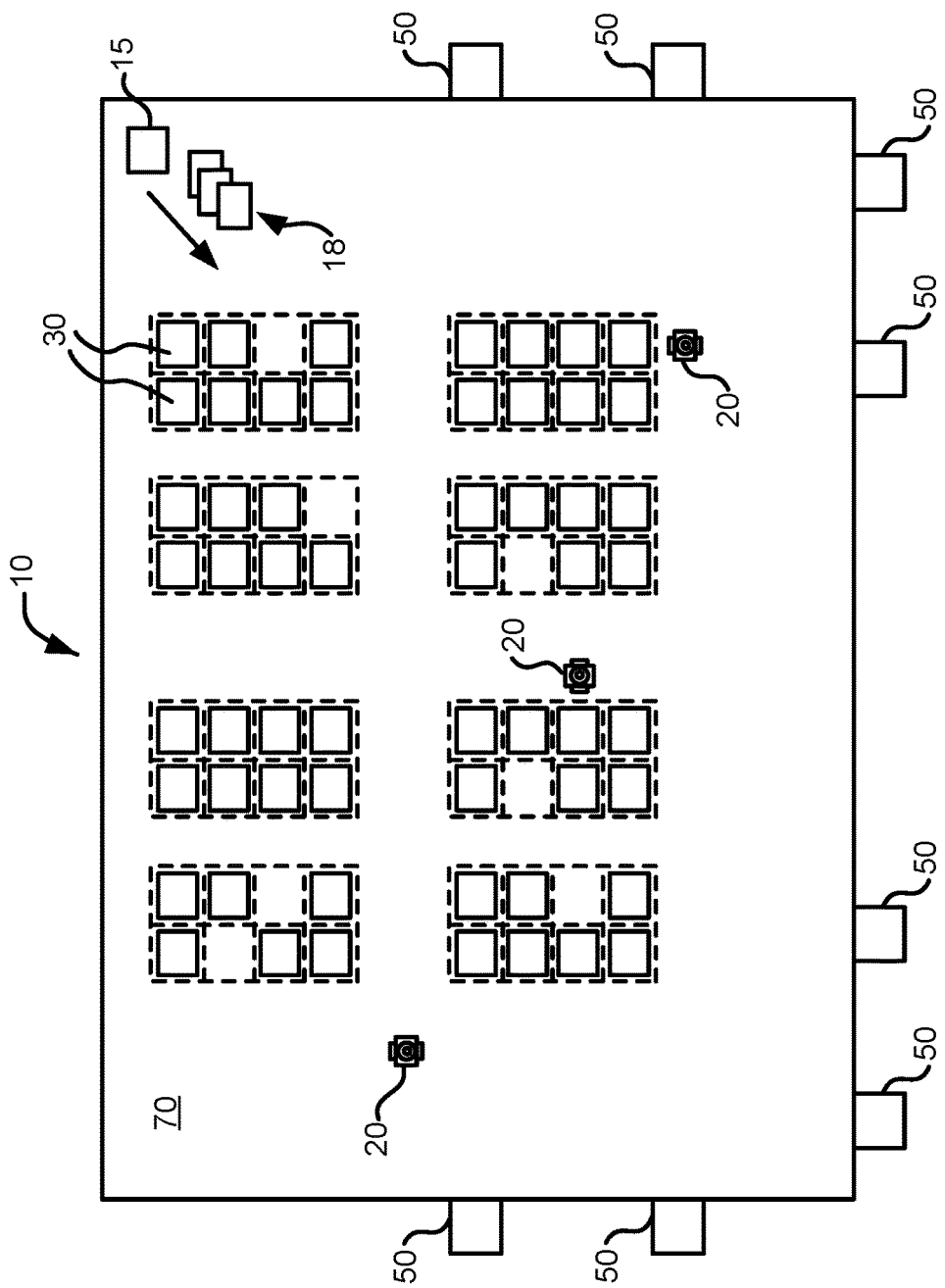
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
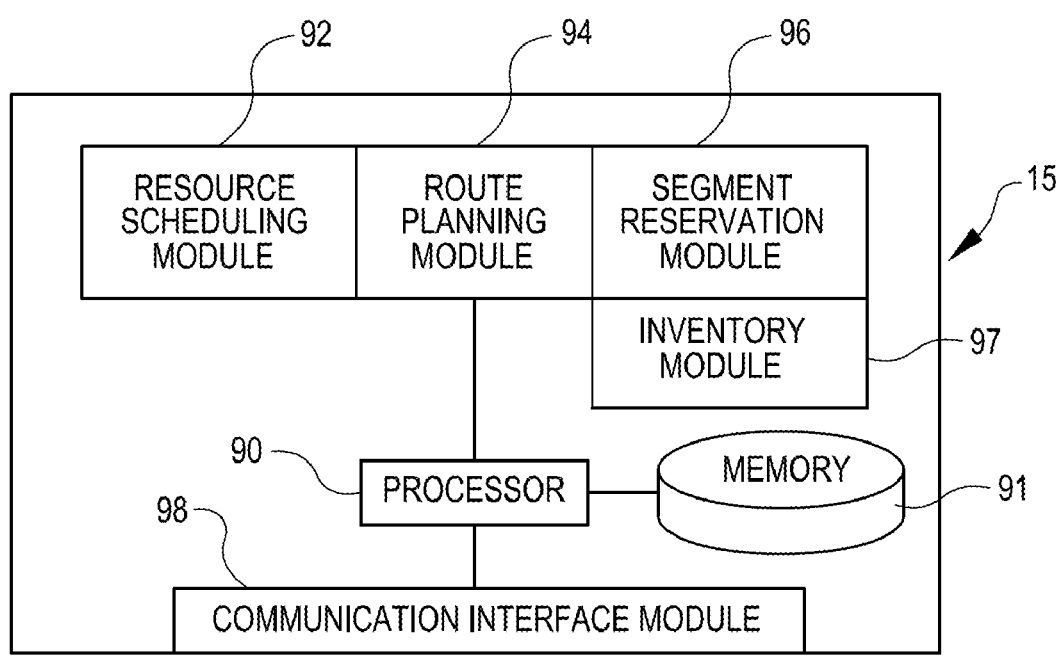
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
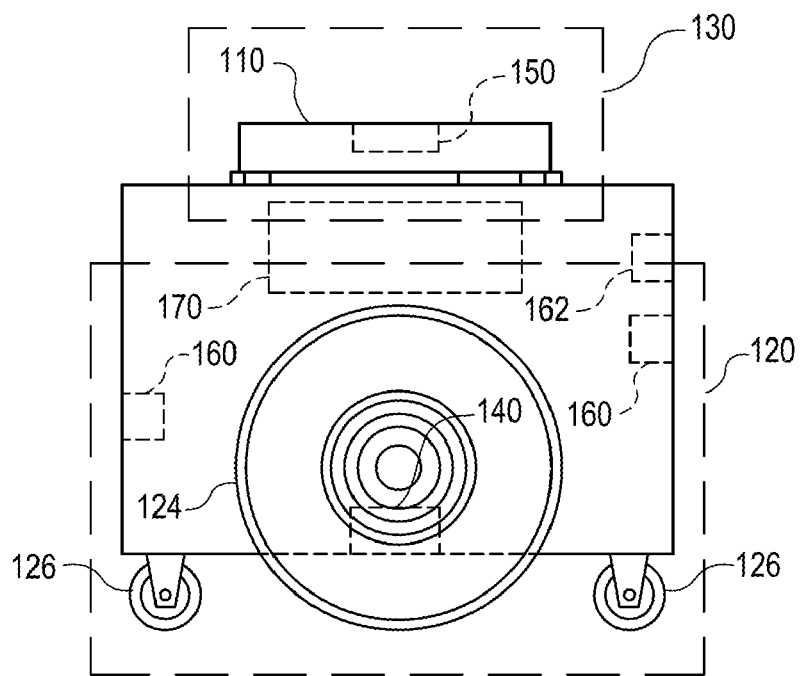
FIGS. 4 and 5 illustrate in greater detail an example mobile drive unit that may be utilized in particular embodiments of the inventory system shown in FIG. 2.
Figure 5:
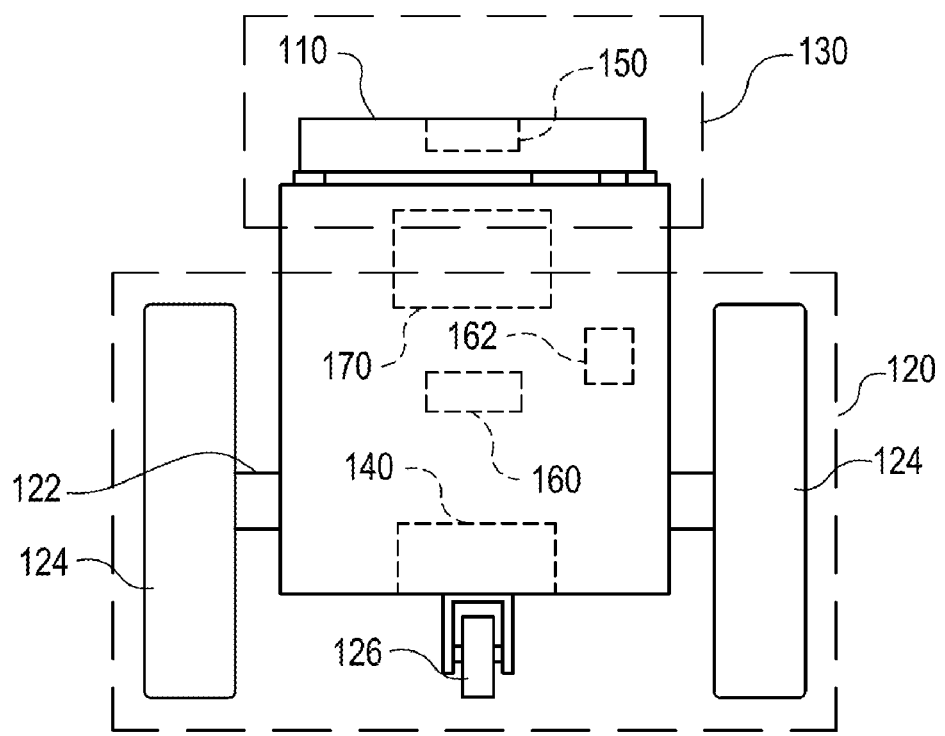

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
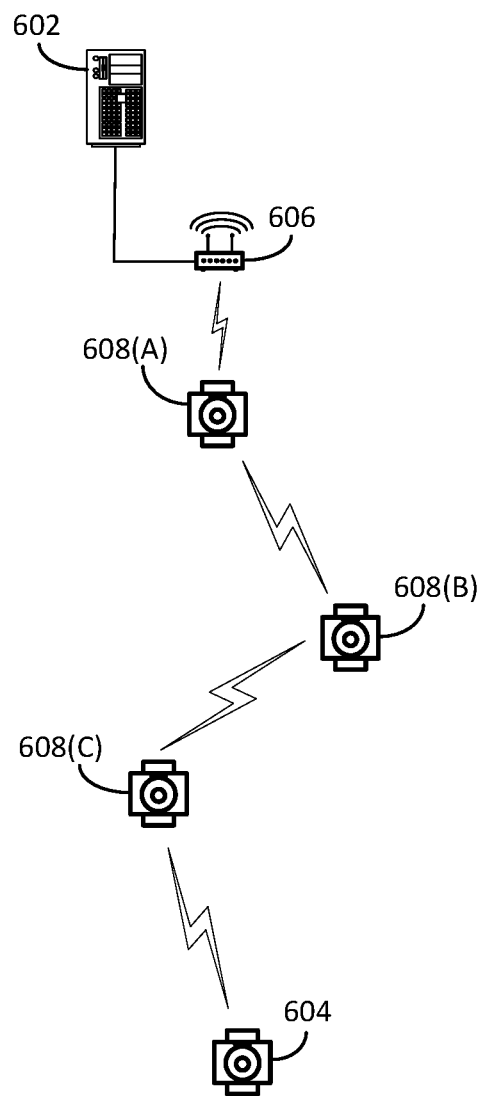
FIG. 6 illustrates an example of an ad hoc network that may be implemented using multiple resources equipped with short range communication mechanisms in accordance with at least some embodiments.

FIG. 6 illustrates an example of an ad hoc network that may be implemented using multiple system components equipped with short range communication mechanisms in accordance with at least some embodiments. In FIG. 6, a computing device 602 may require communication with a particular mobile drive unit 604 that is not within range of a short range communication mechanism 606 used by the computing device 602. In some embodiments, each mobile drive unit may include a communication mechanism capable of enabling the mobile drive unit to communicate with other electronic devices. In some embodiments, each mobile drive unit may maintain and operate its own network via an installed communication mechanism.

In this illustrative example, the computing device 602 may transmit an instruction targeted at the mobile drive unit 604 to any mobile drive units/system components 308(A-C) within range of the short range communication mechanism 606. In this example, each mobile drive unit that receives the instruction may, upon determining that the instruction is not relevant to that mobile drive unit, forward the instruction to other mobile drive units/system components within range of that mobile drive unit. In this way, the instruction may be routed across a series of mobile drive units/system components 308(A-C) to arrive at the specific mobile drive unit 604. In some embodiments, the instruction may be transmitted a predetermined number of times by each mobile drive unit/system component 308(A-C). In some embodiments, each transmitted message may include a message identifier that mobile drive units may use to determine that it has already received/relayed the message.

In some embodiments, a particular mobile drive unit 604 may need to communicate with a specific system component or computing device 602. For example, upon detecting that a particular item was not located within an inventory holder, the mobile drive unit 604 may be required to provide a status alert within a predetermined period of time. In this example, the mobile drive unit 604 may transmit the status alert to another system component within range in a manner similar to that described above. For example, the mobile drive unit 104 may communicate the status alert to mobile drive units/system components 308(A-C) within range of the mobile drive unit 604, which may each subsequently relay the status alert to other mobile drive units/system components 308(A-C) until the status alert has reached the computing device 602.

Figure 7:
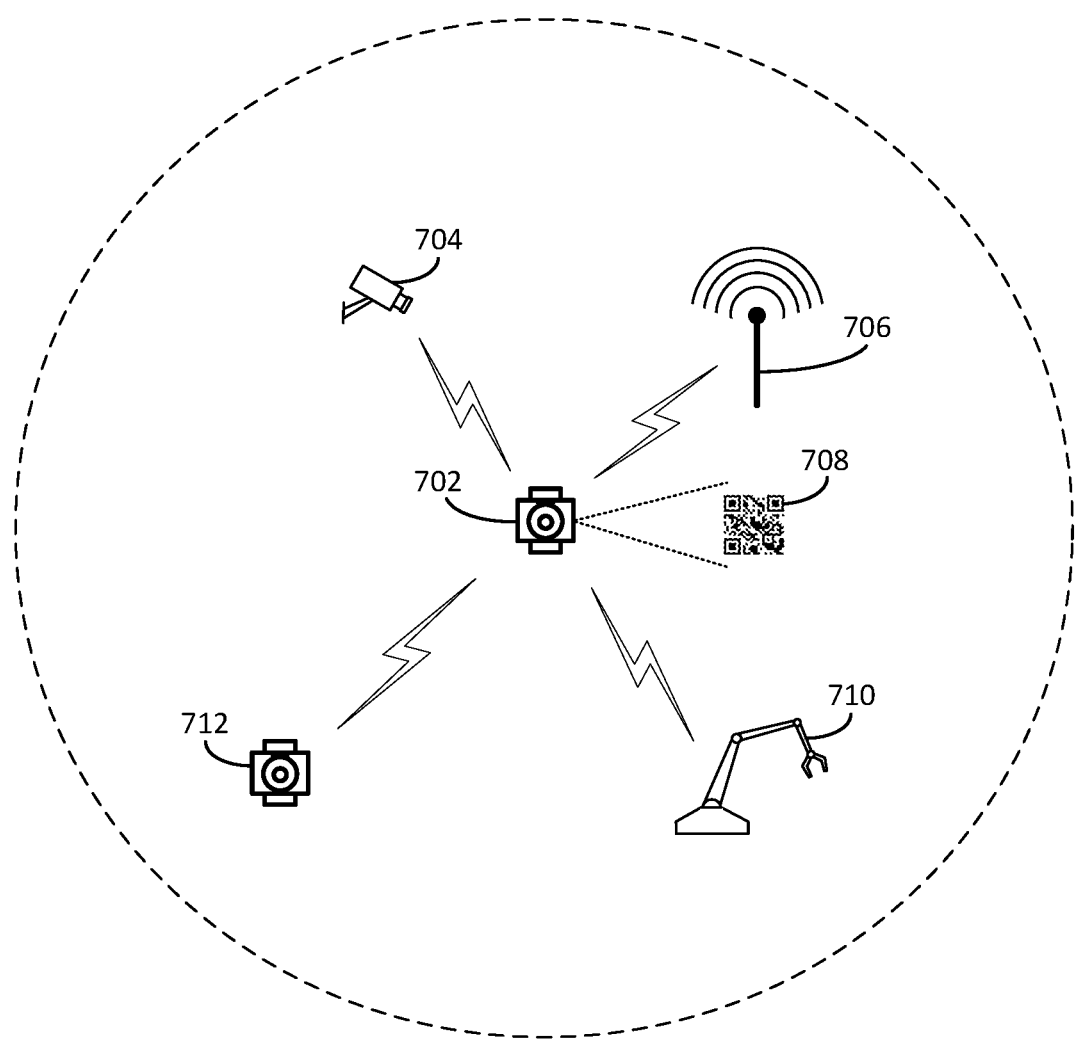
FIG. 7 illustrates some non-limiting example of interactions that may be executed by a mobile drive unit in accordance with at least some embodiments.

FIG. 7 illustrates some non-limiting example of interactions that may be executed by a mobile drive unit in accordance with at least some embodiments. In FIG. 7, a mobile drive unit 702 may operate and maintain a network. For example, the mobile drive unit 702 may include a transmitter/receiver for a wireless area network (WLAN). As the mobile drive unit 702 comes within range of various system components, each of those system components may connect to the mobile drive unit's network. Each system component may be discovered by the mobile drive unit 702 as it connects to the mobile drive unit's network.

In some embodiments, one or more wireless capable input sensors 704 may connect to the mobile drive unit's network. Input sensors 704 may be any devices capable of collecting condition-related input. For example, an input sensor 704 may be a camera device capable of collecting image information, a thermometer capable of collecting temperature data, a weight sensor capable of collecting weight data, or any other suitable sensing device. By way of illustration, an inventory system may include a number of wireless capable camera devices. In this example, the mobile drive unit may connect with each wireless capable camera device as it comes within range of the mobile drive unit's network transmitter/receiver. The mobile drive unit may process image information received from the camera device to identify objects within its surroundings. For example, upon approaching an intersection, the mobile drive unit 702 may connect with a wireless capable camera device to determine whether it may proceed at its current speed or must slow/stop. The mobile drive unit may utilize one or more image processing techniques to process the image. For example, the mobile drive unit may identify an object in the image and/or a velocity at which the object is traveling. In another example, the camera may be positioned to capture images of visible indicators (e.g., floor markings). By determining which floor markings are/are not visible in the image with respect to time, the mobile drive unit may quickly determine that an object is traveling at a particular velocity. In another illustrative example, the mobile drive unit 702 may detect the presence of a weight sensor. In this example, the mobile drive unit 702 may move onto a pressure pad associated with the weight sensor and receive weight information from the weight sensor indicating a current weight of the mobile drive unit 702.

In some embodiments, the mobile drive unit 702 may connect with a beacon 706 or other locator device. For example, an inventory system may include a number of beacons 706 dispersed throughout the inventory floor, each of which provides current location information that may be used by the mobile drive unit 702 to verify its location. In some embodiments, the mobile drive unit 702 may have stored in its memory a map of the inventory floor. The mobile drive unit 702 may utilize this stored map when generating routes using one or more route guidance techniques.

In some embodiments, the mobile drive unit 702 may include input sensors capable of collecting information from data tags 708 located throughout the inventory floor. In some embodiments, data tags 708 may comprise machine readable codes (e.g., barcodes) and the mobile drive unit 702 may be fitted with a camera device capable of inputting and translating the machine readable code. In some embodiments, data tags 708 may comprise radio frequency identification (RFID) tags and the mobile drive unit 702 may be fitted with an RFID reader capable of receiving information from the data tag 708. The data tags 708 may provide the mobile drive unit with information related to a location, an identity of a system component or object (e.g., an identity of an inventory holder), instructions for accessing a resource or area, or any other suitable information. In some embodiments, the data tags 708 may be placed at a particular location or height.

In some embodiments, the mobile drive unit 702 may connect with various system components 710 within its vicinity. For example, the mobile drive unit 702 may connect with a robotic arm in order to provide it with instructions for removing one or more items from an inventory holder. In another example, the mobile drive unit 702 may connect with a loader to provide instructions to load a specified inventory holder onto the mobile drive unit 702. It should be noted that the example system components are merely illustrative and the mobile drive unit 702 may conduct a number of interactions with various system components 710.

In some embodiments, the mobile drive unit 702 may connect with another mobile drive unit 712 that comes within range of the network operated by the mobile drive unit 702. Each of the mobile drive units 702 and 712 may communicate current route information in order to execute one or more collision avoidance techniques. Upon receiving the route information from mobile drive unit 712, mobile drive unit 702 may determine whether a collision is eminent. The mobile drive unit 702 may, upon determining that the current routes are likely to result in a collision, generate a new route to avoid the mobile drive unit 712. The mobile drive unit 702 may subsequently communicate the new route to the mobile drive unit 712. In some embodiments, multiple mobile drive units 712 may connect to the network operated by mobile drive unit 702 and collision avoidance techniques may be implemented with respect to each of those mobile drive units 712. In some embodiments, a master mobile drive unit may be assigned to assign tasks and manage route information for each of the mobile drive units 712 within its vicinity.

Figure 8:
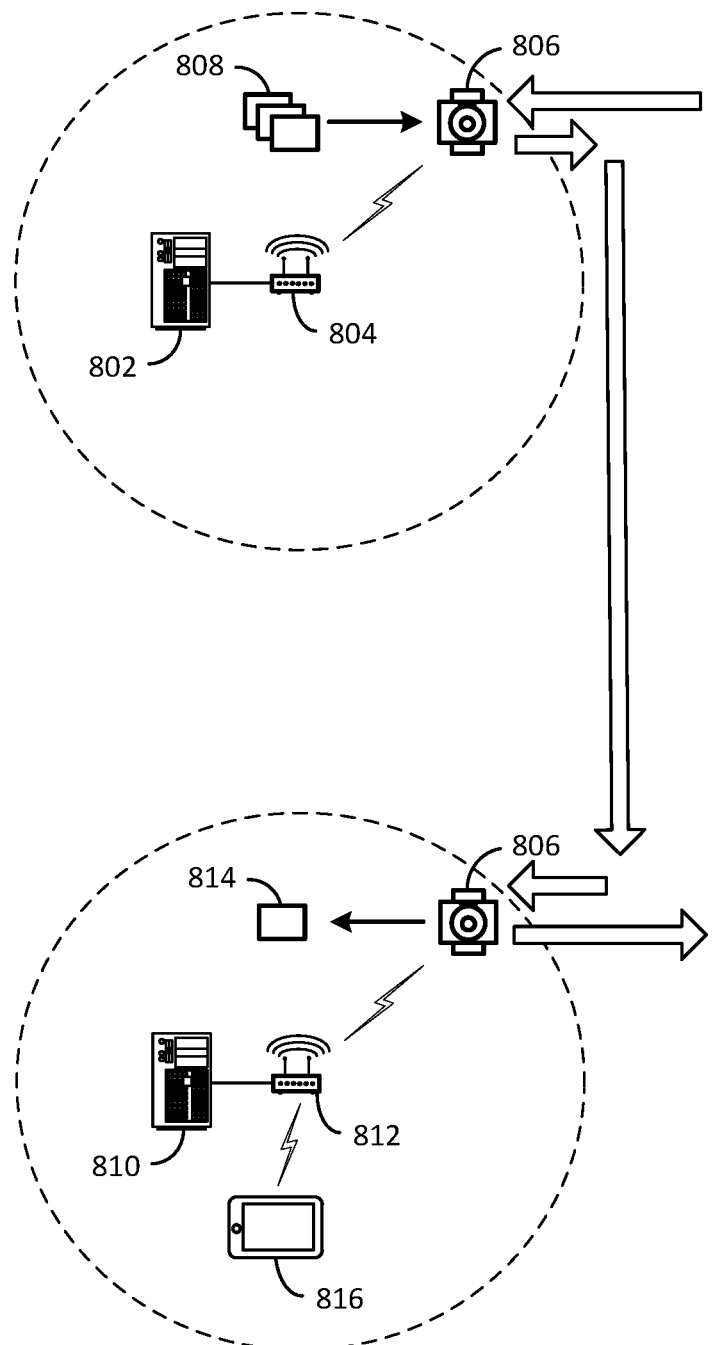
FIG. 8 illustrates an example interaction between a computing device executing a management module, a mobile drive unit, and a computing device associated with a system component in accordance with at least some embodiments.

FIG. 8 illustrates an example interaction between a computing device executing a management module, a mobile drive unit, and a computing device associated with a system component in accordance with at least some embodiments. In FIG. 8, a computing device executing a management module 802 may operate a first local network 804. As a mobile drive unit 806 enters the vicinity of the first local network (e.g., comes within transmission range of a wireless transmitter/receiver), the mobile drive unit 806 is discovered by the computing device 802. Upon discovery, the computing device 802 identifies the next task in a queue of tasks to be completed which the mobile drive unit 806 is capable of completing. In some embodiments, the computing device 802 generates instructions 808 (e.g., a task assignment) to be provided to each system component involved in the completion of the task. For example, the computing device 802 may generate instructions to be executed by the mobile drive unit 806 that include an initial route, inventory holder identifier, and workstation identifier. The computing device 802 may also generate instructions to be executed by a loader device that indicates the inventory holder identifier to be loaded onto the mobile drive unit 806. Additionally, the computing device 802 may generate instructions to be executed by a workstation computing device. In some embodiments, each of the generated instructions may be provided to the mobile drive unit 806, and may subsequently be distributed to each computing device 810 associated with each respective system component by the mobile drive unit 806 as it comes into proximity of that system component.

Once the mobile drive unit 806 has received the set of instructions generated by the computing device 802, the mobile drive unit 806 may execute the instructions pertaining to the mobile drive unit itself. In some embodiments, as the mobile drive unit 806 traverses the inventory floor, a number of system components may connect to a network operated by the mobile drive unit 806. In some embodiments, as the mobile drive unit 806 traverses the inventory floor, it may connect to a number of second local networks 812 operated by a number of computing devices 810 associated with various system components. In some embodiments, as each local network 812 associated with system component is connected to, the mobile drive unit 806 may determine whether any of the instructions generated by, and received from, the computing device 802 are intended for that system component. In some embodiments, when the mobile drive unit 806 detects a network, it may determine whether any of the instructions generated by, and received from, the computing device 802 are intended for the system component associated with the detected network prior to connecting to that network. For example, the mobile drive unit may detect an identifier for the system component associated with the network based on the name of the network. Upon determining that the detected identifier is associated with a relevant system component, the mobile drive unit 806 may connect to the network operated by that system component. Additionally, the mobile drive unit 806 may be configured to, upon discovering system components such as input sensors, receive and process input relevant to its assigned tasks from those input sensors.

Upon determining that the instructions generated by, and received from, the computing device 802 are intended for a system component that the mobile drive unit 150 is currently communicatively connected to, the mobile drive unit 806 may transmit those instructions 814 to a computing device 810 associated with that system component. In some embodiments, instructions 814 may be a subset of instructions 808 (e.g., instructions 814 may include instructions relevant to a particular system component). In some embodiments, the instructions 814 may cause the system component to carry out one or more actions automatically (e.g., without further human interaction). In some embodiments, the instructions 814 may cause the system component to provide instructions to an operator stationed at the system component. For example, the operator may be provided instructions via a display device 816 in communication with the computing device 810. The mobile drive unit 806 may await a response from the computing device 810 before exiting the vicinity of the system component.

In some embodiments, the set of instructions 808 provided to the mobile drive unit 806 may include instructions for a number of system components to be interacted with in a specified order. In these embodiments, the mobile drive unit 806 may traverse to the each system component in the number of system components, provide the respective instructions 814 to that system component, await a response from the system component, and repeat until the mobile drive unit has received a response to each set of instructions 814 in the set of instructions 808 provided by the computing device 802. In some embodiments, the mobile drive unit 806 may break from this process upon receiving an indication that one or more tasks cannot be completed. For example, upon determining that an inventory holder is not present, the mobile drive unit 806 may transmit a status alert indicating that the inventory holder is missing and may subsequently traverse back to the computing device 802 for another assignment.

Figure 9:
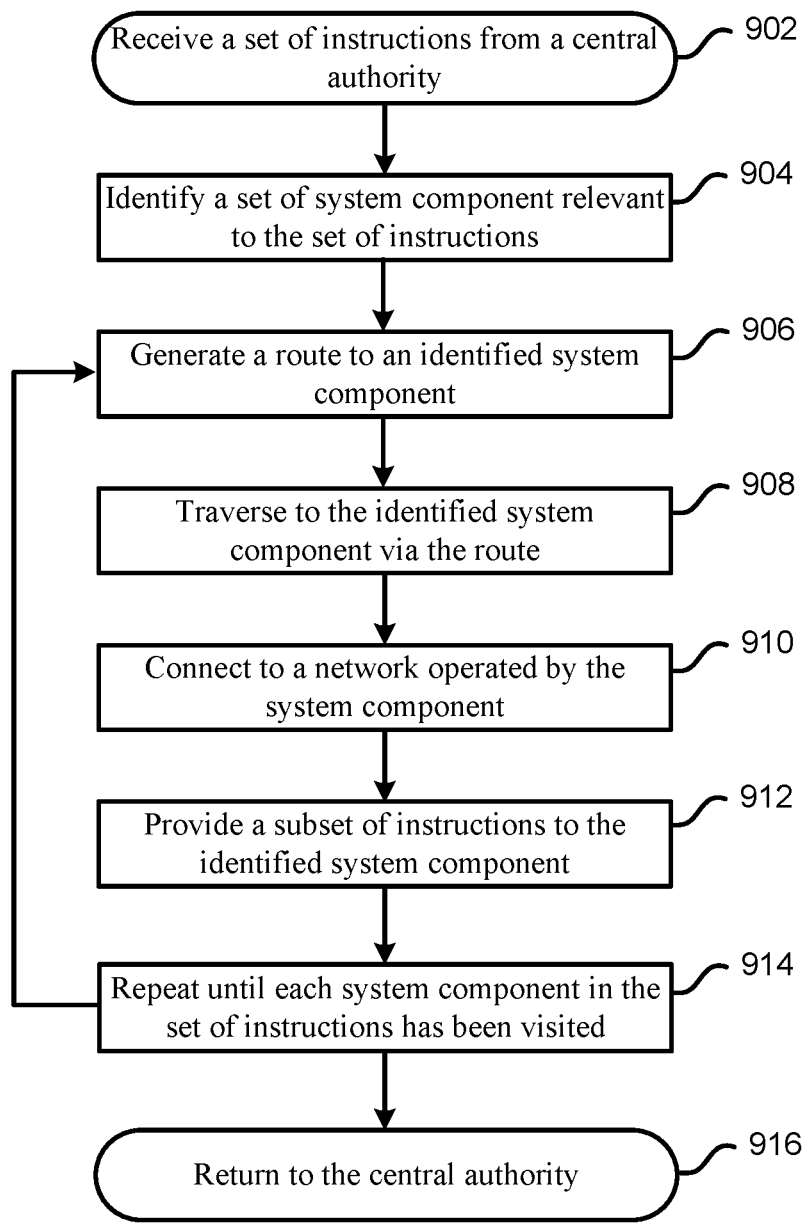
FIG. 9 illustrates a flow diagram of a process for managing inventory via a series of local networks in accordance with at least some embodiments.

FIG. 9 illustrates a flow diagram of a process for managing inventory via a series of local networks in accordance with at least some embodiments. Some or all of the process 900 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 900 of FIG. 9 may be performed by at least the one or more mobile drive units shown in FIGS. 3-5. The code may be stored on a computer-readable storage medium, for example, in the form of a computer program including a plurality of instructions executable by one or more processors. The computer-readable storage medium may be non-transitory.

In FIG. 9, a computing device executing a management module (e.g., a central authority) may be configured to manage inventory processing by a number of mobile drive units. In some embodiments, the computing device executing the management module may be a server device or another suitable computing device. In some embodiments, the computing device executing the management module may be a "master" mobile drive unit or other suitable mobile unit. For example, a number of mobile drive units may connect to a network operated by the master mobile drive unit to receive task assignments, route information, inventory information, or any other suitable information. In process 900, the management module may be configured to detect a mobile drive unit connected to a local network (e.g., via a discovery process). Once a mobile drive unit has been discovered, the management module may be configured to assess one or more capabilities of the mobile drive unit. The management module may subsequently be configured to select a task in a queue of tasks to be assigned to the mobile drive unit.

Process 900 may begin at 902 when the mobile drive unit receives a set of instructions from a central authority. In some embodiments, the central authority may identify a set of tasks to be completed and may determine a subset of those tasks that may be completed by the mobile drive unit. From that subset of tasks, the central authority may identify a task with the highest priority to be completed by the mobile drive unit. Once the central authority has identified a task, the central authority may identify a number of system components associated with that task. For example, if the task is associated with fulfillment of a particular order, the central authority may determine a location (e.g., an inventory holder) of one or more items included in the order as well as a workstation handling the order. In this example, the central authority may generate a set of instructions to cause the mobile drive unit to traverse to the identified location, retrieve the one or more items (or the inventory holder with the one or more items), traverse to the workstation, and communicate an indication of the one or more items to the workstation. The generated set of instructions may be transmitted to the mobile drive unit via a wireless network connection.

At 904, the mobile drive unit may identify a set of system components relevant to the received set of instructions. For example, the set of instructions may include an indication of a set of system components as well as actions to be taken with regard to each of those system components. System components may comprise robotic devices configured to execute specified actions, input sensors capable of collecting system-related data, workstation computing devices, inventory holders, or any other suitable component of the inventory system. The mobile drive unit may identify a system component from the set of system components to be interacted with next.

At 906, the mobile drive unit may generate a route to the next identified system component of the set of system components. In some embodiments, the route may be generated by the central authority and provided to the mobile drive unit. At 908, the mobile drive unit may traverse to the identified system component via the generated route.

At 910, the mobile drive unit may, upon coming into proximity of a system component, connect to a wireless local network operated with respect to that system component. The mobile drive unit may, upon connecting to each network, determine if the associated system component is one for which the mobile drive unit has received instructions. If the mobile drive unit determines that the connected system component is the next identified system component, then it may initiate an action indicated in the set of instructions with respect to that system component. In some embodiments, the mobile drive unit may determine that the system component is not the next identified system component, but may take an action with regard to the system component. For example, the mobile drive unit may determine that the system component is a wireless capable camera device. In this example, the mobile drive unit may connect to the camera device in order to receive image information related to the surrounding area, which the mobile drive unit may subsequently process in order to make route determinations.

At 912, the mobile drive unit may provide, via the wireless local network, a subset of the set of instructions to the system component. For example, if the next identified system component is an inventory loader device, a subset of instructions directed to the inventory loader device may be generated which causes it to load a specified item or inventory holder onto the mobile drive unit. Upon entering within proximity (e.g., within wireless transmission range of the wireless local network) of the inventory loader device, the mobile drive unit may transmit that subset of instructions to the inventory loader device via the wireless local network operated with respect to the inventory loader device.

At 914, each of steps 906 through 912 may be repeated until each of the system components in the indicated set of system components has been visited by the mobile drive unit. Once each of the system components in the indicated set of system components has been visited and each action in the set of instructions has been performed, the mobile drive unit may return to the central authority at 916 to await further instructions. In some embodiments, the mobile drive unit may record status-related data during execution of the provided set of instructions. Upon entering within the proximity of the central authority, the mobile drive unit may connect to a wireless local network operated with respect to the central authority and may subsequently report the status-related data to the central authority.

Figure 10:
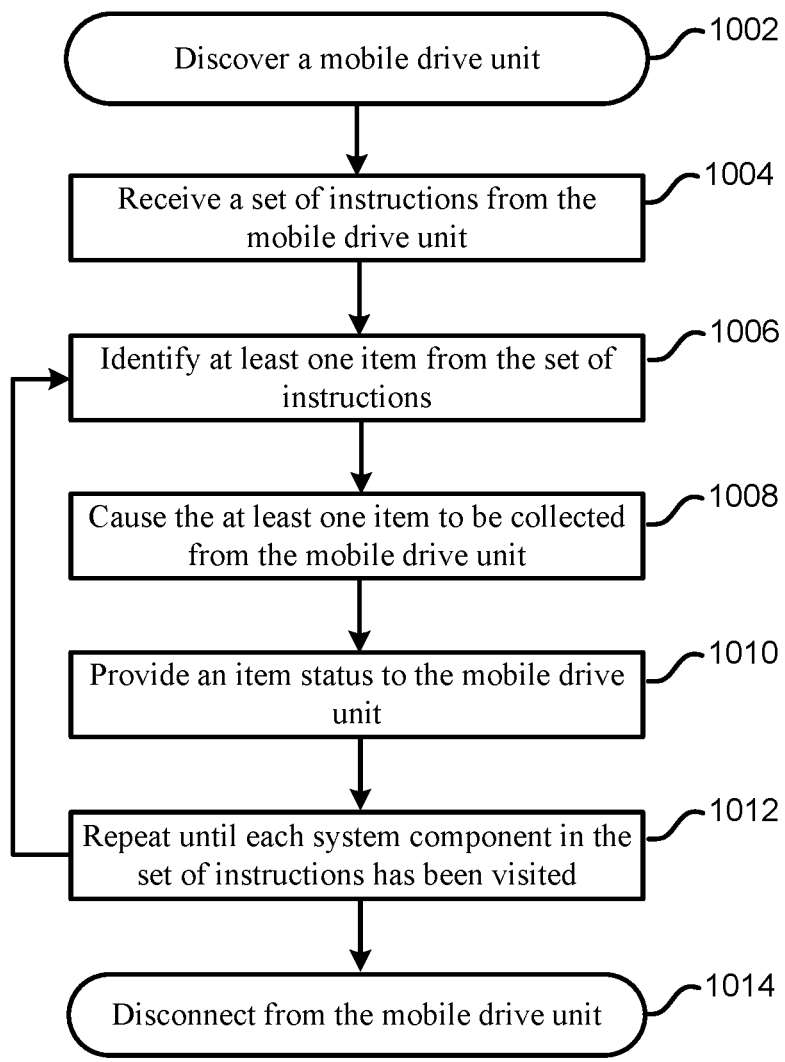
FIG. 10 illustrates a flow diagram of a process for fulfilling tasks conveyed by a mobile drive unit in accordance with at least some embodiments.

FIG. 10 illustrates a flow diagram of a process for fulfilling tasks conveyed by a mobile drive unit in accordance with at least some embodiments. In accordance with at least one embodiment, the process 1000 of FIG. 10 may be performed by a system component, and in particular, a workstation computing device.

Process 1000 may begin at 1002, when a mobile drive unit is discovered by a network operated on behalf of the workstation computing device. In some embodiments, the mobile drive unit may connect to each network that it encounters. In some embodiments, the workstation computing device may advertise an identifier via the network. For example, the network may be named to include the identifier for the workstation. In this example, the mobile drive unit may detect the network, identify the workstation, and determine whether to connect to the network based on the workstation identity.

At 1004, the workstation computing device may receive a subset of a set of instructions from the mobile drive unit via the network connection. In some embodiments, the set of instructions may have been generated by a central authority and provided to the mobile drive unit. In some embodiments, the set of instructions may have been generated by the mobile drive unit. The set of instructions may be provided in any suitable form. For example, the set of instructions may comprise computer-executable instructions. In another example, the set of instructions may comprise an indication of an order currently being processed at the workstation, one or more item identifiers, a quantity for each of the one or more item identifiers, and any other suitable information related to fulfillment of the order (e.g., a picture of an item, a location of an item within an inventory holder, an item description, etc.).

At 1006, the workstation computing device may identify at least one item from the received set of instructions. In some embodiments, the set of instructions may include an instruction to collect a specific item from an inventory holder currently carried by the mobile drive unit. For example, the instructions may include the text "collect item 12736 from slot 4A of inventory holder 98D." In another example, the instructions may include the text "collect 5 of the items located in slot 6F."

At 1008, the workstation computing device may cause the at least one item to be collected from the mobile drive unit. In some embodiments, causing the at least one item to be collected from the mobile drive unit may comprise displaying the received instruction on a display device to an operator located at the workstation. In some embodiments, causing the at least one item to be collected from the mobile drive unit may comprise providing instructions to a robotic arm or other loader/unloader device.

At 1010, the workstation computing device may provide an item status to the mobile drive unit. In some embodiments, the workstation computing device may be connect to an input sensor capable of determining whether the item has been collected. For example, the workstation computing device may be connected to a LIDAR sensor capable of determining a location that an item was removed from. In another example, the workstation computing device may be equipped with digital imaging equipment (e.g., a camera device). In this example, the workstation computing device may use one or more image processing techniques to determine whether an item removed from the inventory holder is the identified item. In another example, an operator located at the workstation computing device may scan a barcode on the item into a barcode scanner communicatively coupled to the workstation computing device. In some embodiments, an operator may manually input an indication that the item has or has not been collected. Upon determining whether the item has or has not been collected, the workstation computing device may generate a status for that item. For example, the workstation computing device may associate each item with a "success" or "failure" status. The workstation computing device may subsequently provide the status for the item to the mobile drive unit.

At 1012, each of steps 1006 through 1010 may be repeated for each item identified in the set of instructions. The mobile drive unit may compile a set of statuses that includes statuses for each item to be collected by the workstation. In some embodiments, the workstation computing device may determine alternative inventory holders/locations for each of the identified items associated with a failure status. In these embodiments, the workstation computing device or the mobile drive unit may update the set of instructions received from the central authority to cause the mobile drive unit to return the current inventory holder, traverse to the alternative location, collect the alternative inventory holder, and return to the workstation computing device.

At 1014, the workstation computing device may disconnect from the mobile drive unit. In some embodiments, the mobile drive unit may be configured to execute additional instructions in the set of instructions upon determining that the connection to the network has been severed. In some embodiments, the mobile drive unit may be configured to provide the set of statuses to the central authority upon determining that the connection to the network has been severed.

In accordance with at least some embodiments, one or more system components may be configured to act when it receives a set of instructions provided by an authorized mobile drive unit. In some embodiments, each system component may act only upon receiving instructions from a mobile drive unit within its vicinity. For example, upon arriving at a system component, the mobile drive unit may connect to a wireless network associated with that system component, provide proof of authorization (e.g., an authentication code or other verification mechanism), and transmit a set of instructions to the system component. For example, a robotic arm may be configured to retrieve an item from a mobile drive unit only when there is an actual mobile drive unit in front of it and/or only in response to receiving instructions from the mobile drive unit. The set of instructions and/or wireless network may be encrypted.

In accordance with at least some embodiments, the mobile drive unit may be configured to process information provided to it over a first wireless network and deliver that processed information to a second wireless network. For example, the mobile drive unit may be provided with a set of information from a first system component with instructions to provide it to a second system component. In this example, the mobile drive unit may scrub and/or analyze the set of information in accordance with security settings, traverse to the second system component, and provide a subset of the set of information to the second system component (e.g., a scrubbed version of the set of information). In some embodiments, the mobile drive unit may store security settings associated with a number of system components, and may, upon receiving instructions to provide information to a target system component, process the information in accordance with the security settings for that target system component before delivering it as instructed.

In accordance with at least some embodiments, the system may be configured to facilitate a bulk transfer of data from one physical location to another. For example, it may be desirable to prevent direct communication between various system components for security purposes. In this example, data to be moved from one system component to another could be uploaded to a mobile drive unit via a first local network. The mobile drive unit may then be configured to traverse to the second system component and upload the data to that second system component via a second local network. In this example, the mobile drive unit may return to the first system component and provide an indication that the data has been successfully transferred, upon which the first system component may delete the data from its memory.

Implementation of embodiments of the disclosure provide for a number of technical advantages. For example, in inventory systems in which each mobile drive unit is connected to a single network, route guidance for each of the mobile drive units needs to be calculated by a central authority in order to prevent collisions between the mobile drive units. In such a system, generating routes for each of the mobile drive units to avoid collisions is very processing intensive, and each addition of a new mobile drive unit to the system results in the generation of new routes that needs to be compared to every other existing route. Such a system therefor requires an exponential increase in processing power for each additional mobile drive unit. In some embodiments of the disclosure, routes may be calculated by the mobile drive unit itself and collision avoidance need only be performed with regard to other mobile drive units that enter within a particular mobile drive unit's vicinity. This frees up a significant amount of bandwidth and processing power for the system overall, in that the central authority need not perform any collision avoidance and the mobile drive unit performs only a fraction of the collision avoidance that would have been performed by the central authority.

Processing and bandwidth are also reduced in relation to system components. For example, in some inventory systems, the central authority may receive input feeds from each system component within the system, process that input feed, and provide one or more outputs to a mobile drive unit based on the processed input feed. Information provided by these system components is processed by the central authority even if the system components are not currently being used. In embodiments of the disclosure, each system component is accessed directly by the mobile drive unit and only when it is within the vicinity of that system component. Accordingly, the overall amount of processing performed by the inventory system is significantly reduced for another reason, as only relevant input is processed.

Additionally, in inventory systems in which workstations are in direct communication with a central authority, the central authority may provide an indication of which items to remove from an inventory holder directly to the workstation. In this system, the central authority must provide instructions to each workstation that is scheduled to receive a mobile drive unit that includes a list of items to be removed from an inventory holder. Additionally, a workstation computing device must receive an indication that the inventory holder and/or mobile drive unit has arrived at the workstation. The workstation computing device must then identify any instructions previously received in relation to that inventory holder and/or mobile drive unit from the central authority. In embodiments of the disclosed system, all instructions related to a particular mobile drive unit may be provided to that mobile drive unit. That a mobile drive unit has connected to a network associated with a particular workstation is an indication that the mobile drive unit is in the vicinity of the workstation. Accordingly, instructions related to the mobile drive unit are provided to each workstation as those instructions become relevant. The disclosed system eliminates the need for many, if not all, communications between a workstation computing device and a central authority. This creates a more autonomous inventory system that is less prone to failure.

Additionally, by preventing system components from communicating directly, the system can be made more secure than traditional systems. For example, the mobile drive unit may act as a physical barrier between two local networks in that all information exchanged between the networks must be done in accordance with the described techniques. This prevents multiple system components from being compromised by an unauthorized party in the event that a single system component is compromised.

Figure 11:
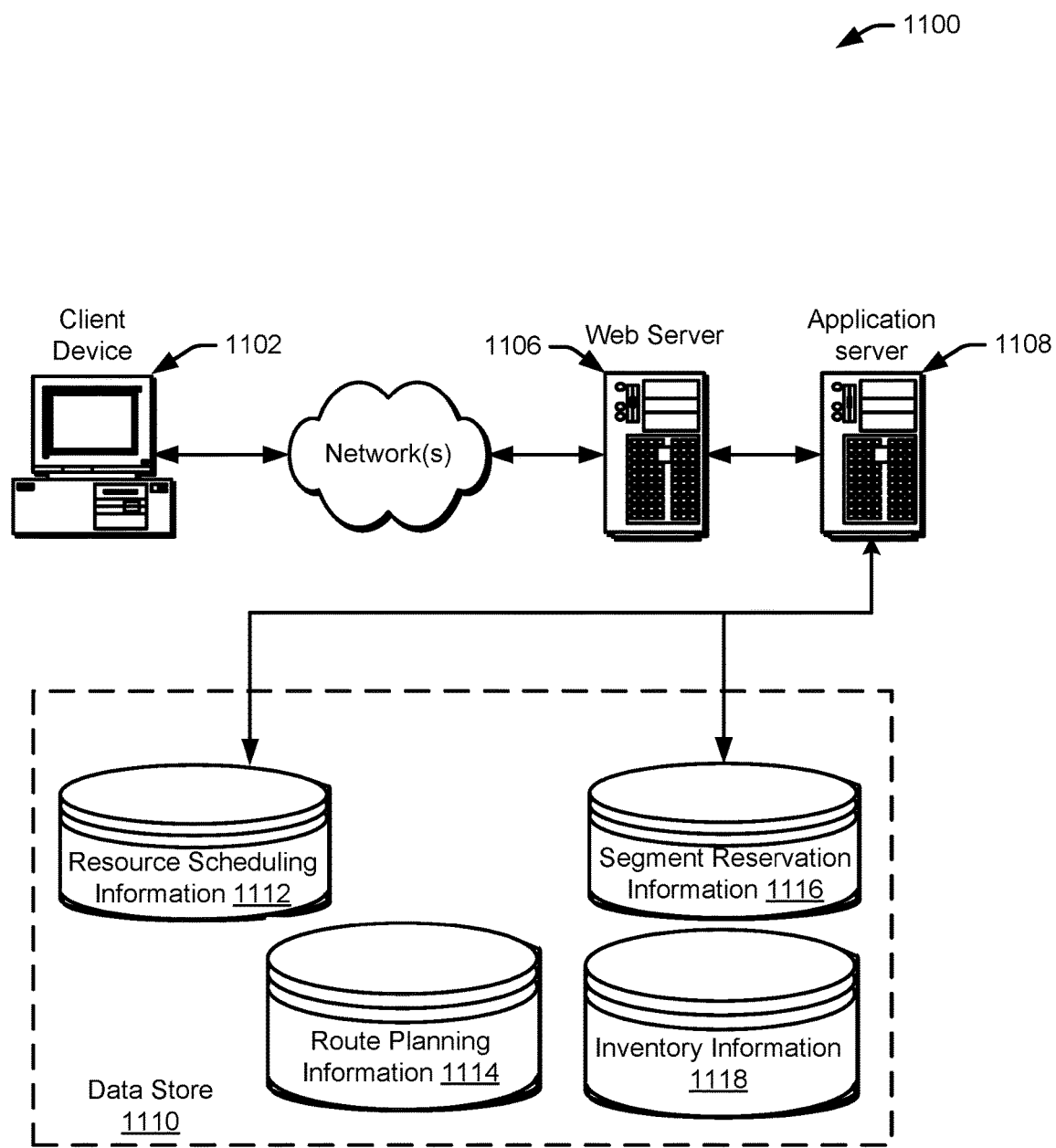
FIG. 11 illustrates an environment in which various features of the inventory system can be implemented, in accordance with at least one embodiment.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing information which can be used by modules described herein, such as resource scheduling information 1112, route planning information 1114, segment reservation information 1116, and/or inventory information 1118. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
a workstation of a workspace, the workstation being configured with at least one processor configured to perform a task related to one or more inventory items associated with an inventory holder when the inventory holder is positioned at the workstation;
a local area network associated with the workstation and configured to connect the workstation with one or more mobile drive units within a connectivity range from the workstation;
a management system configured to provide instructions to the one or more mobile drive units in relation to the one or more inventory items;
a mobile drive unit configured to convey the inventory holder within the workspace, the mobile drive unit comprising:
a processor; and
a memory comprising instructions that, when executed with the processor, cause the mobile drive unit to, at least:
receive, from the management system, a set of instructions that comprises an indication of the workstation and a subset of instructions to be executed by the at least one processor of the workstation with respect to the one or more inventory items;
traverse along a route determined based on the set of instructions;
connect to the local area network associated with the workstation as the mobile drive unit enters a proximity of the workstation associated with the local area network;
identify an identifier for the workstation based at least in part on a parameter associated with the local area network associated with the workstation;
determine that the identifier of the workstation corresponds to the subset of instructions received from the management system; and
in response to determining that the identifier of the workstation corresponds to the subset of the instructions received from the management system, transmit, via the local area network, the subset of instructions received from the management system to the workstation, wherein transmitting the subset of instructions causes the at least one processor of the workstation to execute the subset of instructions to perform the task.

2. The inventory system of claim 1, wherein the instructions stored in the memory of the mobile drive unit further cause the mobile drive unit to:
connect to a second mobile drive unit;
receive route information from the second mobile drive unit; and
adjust a current route of the mobile drive unit to avoid collision with the second mobile drive unit based on the received route information.

3. The inventory system of claim 1, wherein the instructions stored in the memory of the mobile drive unit further cause the mobile drive unit to:
upon connecting to the local area network associated with an input sensor, receive input from the input sensor; and
adjust a current route of the mobile drive unit based on the received input.

4. The inventory system of claim 1, wherein the task related to one or more inventory items comprises displaying an instruction to collect the one or more inventory items on a display device.

5. A method, comprising:
receiving, by a mobile drive unit, a set of instructions that includes an indication of a system component different from the mobile drive unit and one or more component instructions to be executed by a processor of the system component, the one or more component instructions configured to cause the processor of the system component to perform at least one action;

traversing, by the mobile drive unit, to the system component;

while traversing, by the mobile drive unit, establishing a connection between the mobile drive unit and a local area network operated by the mobile drive unit or the system component as the mobile drive unit enters a proximity of the system component;

identifying that the one or more component instructions are intended for the system component corresponding to the connection established; and in response to establishing the connection and identifying that the one or more component instructions are intended for the system component, transmitting the one or more component instructions to be executed by the processor system component over the local area network to cause the processor of the system component to execute the component instruction to perform the at least one action.

6. The method of claim 5, wherein the system component is one of a plurality of system components that comprises a combination of robotic devices, input sensors, inventory holders, and workstations.

7. The method of claim 6, further comprising upon receiving a response via the local area network, updating a status associated with an inventory item.

8. The method of claim 7, wherein the status is updated to indicate a failure upon determining that the at least one action is unable to be performed.

9. The method of claim 8, further comprising upon determining that the status indicates a failure, transmitting a status alert to a second mobile drive unit within wireless transmission range of the mobile drive unit, the transmitting of the status alert being repeated by the second mobile drive unit.

10. The method of claim 6, wherein the system component comprises a workstation.

11. The method of claim 10, wherein the traversing to the system component comprises collecting an inventory holder and delivering the inventory holder to the workstation.

12. The method of claim 11, wherein the at least one action comprises a command to present instructions to an operator of the workstation to remove at least one item from the inventory holder.

13. The method of claim 6, wherein the system component comprises an inventory loader and providing the one or more component instructions causes the inventory loader to load an inventory holder onto the mobile drive unit through execution of the one or more component instructions.

14. A mobile drive unit apparatus comprising:
a processor; and
a memory including instructions that, when executed with the processor, cause the mobile drive unit apparatus to, at least:
receive a set of instructions that comprises an indication of at least one system component and an action to be executed by a processor of the at least one system component, the set of instructions comprising a first subset of instructions to be executed by the mobile drive unit and a second subset of instructions to be executed by the processor of the system component to perform the action;
traverse to the at least one system component in accordance with the first subset of instructions received;
detect that the mobile drive unit is within transmission range of a local area network of a plurality of local area networks;
connect to the local area network to determine a system component with which the local area network is associated; and
in response to determining that the system component that the local area network is associated with comprises the at least one system component with which the second subset of instructions are to be executed, transmit the second subset of instructions to the at least one system component, wherein the second subset of instructions causes the processor of the at least one system component to execute the second subset of instructions to perform the action with respect to at least one inventory item.

15. The mobile drive unit apparatus of claim 14, further comprising upon determining that the system component that the local area network is associated with is not the at least one system component, recording information related to the system component.

16. The mobile drive unit apparatus of claim 15, wherein the recorded information is transmitted to a central authority.

17. The mobile drive unit apparatus of claim 14, wherein the instructions further cause the mobile drive unit apparatus to:
detect that the mobile drive unit is within transmission range of a second local area network of the plurality of local area networks;
connect to the second local area network to determine a second system component with which the local area network is associated; and
upon determining that the second system component is relevant to the set of instructions, execute a second action.

18. The mobile drive unit apparatus of claim 14, wherein the instructions further cause the mobile drive unit apparatus to generate a route to each of the at least one system component based on the received set of instructions.

19. The mobile drive unit apparatus of claim 18, wherein a status associated with the set of instructions is set to complete once the mobile drive unit has traversed to each of the at least one system component.

20. The mobile drive unit apparatus of claim 19, wherein the instructions further cause the mobile drive unit apparatus to return to a central authority once the status associated with the set of instructions is set to complete.

* * * * *